(12) United States Patent
Cheraghi et al.

(10) Patent No.: US 11,050,465 B2
(45) Date of Patent: Jun. 29, 2021

(54) USER EQUIPMENT INITIATED CHANNEL STATE FEEDBACK CODEBOOK SELECTION

(71) Applicant: QUALCOMM Incorporated, San Diego, CA (US)

(72) Inventors: Parisa Cheraghi, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/449,293

(22) Filed: Jun. 21, 2019

(65) Prior Publication Data

US 2020/0403656 A1 Dec. 24, 2020

(51) Int. Cl.
*H04B 7/0417* (2017.01)
*H04B 17/336* (2015.01)
*H04B 7/0452* (2017.01)
*H04B 7/0456* (2017.01)
*H04B 7/06* (2006.01)

(52) U.S. Cl.
CPC ......... *H04B 7/0417* (2013.01); *H04B 7/0452* (2013.01); *H04B 7/0456* (2013.01); *H04B 7/0626* (2013.01); *H04B 7/0639* (2013.01); *H04B 17/336* (2015.01)

(58) Field of Classification Search
CPC .. H04B 7/0417; H04B 17/336; H04B 7/0626; H04B 7/0456; H04B 7/0639; H04B 7/0452
See application file for complete search history.

(56) References Cited

U.S. PATENT DOCUMENTS

| | | | | |
|---|---|---|---|---|
| 9,485,661 | B2 * | 11/2016 | Gorokhov | H04B 7/0626 |
| 9,872,242 | B2 * | 1/2018 | Xiao | H04W 48/20 |
| 10,491,356 | B2 * | 11/2019 | Gorokhov | H04W 24/10 |
| 10,727,909 | B2 * | 7/2020 | Xu | H04B 7/0639 |
| 2008/0232503 | A1 * | 9/2008 | Kim | H04B 7/065 375/267 |

(Continued)

FOREIGN PATENT DOCUMENTS

WO WO-2010118653 A1 * 10/2010 ........... H04B 7/0639

OTHER PUBLICATIONS

International Search Report and Written Opinion—PCT/US2020/037564—ISA/EPO—dated Mar. 25, 2021.

*Primary Examiner* — Jay P Patel
(74) *Attorney, Agent, or Firm* — Qualcomm Incorporated

(57) ABSTRACT

Aspects are provided allowing a UE configured for Type II channel state feedback (CSF) to determine based on one or more antenna configurations or channel conditions whether to use the Type II codebook or to revert to a Type I codebook when computing CSF. Based on this determination, the UE may compute CSF based on the Type I codebook in situations where the performance gain of Type II codebooks may be reduced, thereby saving computational power, transmission power, and/or overhead when computing and reporting CSI feedback. The UE may subsequently transmit the CSF computed based on the Type I codebook in the allocated resources for Type II CSI feedback without the need for a separate signaling format, thereby simplifying and enabling reuse of the CSI feedback procedure.

24 Claims, 11 Drawing Sheets

(56) References Cited

U.S. PATENT DOCUMENTS

| | | | |
|---|---|---|---|
| 2010/0104033 A1* | 4/2010 | Gorokhov | H04L 1/0026 375/260 |
| 2012/0257664 A1* | 10/2012 | Yue | H04L 1/0035 375/227 |
| 2013/0051321 A1 | 2/2013 | Barbieri et al. | |
| 2013/0136062 A1* | 5/2013 | Gorokhov | H04B 7/0626 370/328 |
| 2014/0254517 A1 | 9/2014 | Nam et al. | |
| 2014/0369279 A1* | 12/2014 | Yu | H04B 7/063 370/329 |
| 2015/0223161 A1* | 8/2015 | Xiao | H04B 7/0417 370/329 |
| 2016/0143055 A1* | 5/2016 | Nammi | H04W 74/006 370/329 |
| 2016/0182135 A1* | 6/2016 | Onodera | H04W 16/28 375/267 |
| 2018/0278306 A1 | 9/2018 | Lee et al. | |
| 2018/0309490 A1 | 10/2018 | Rahman et al. | |
| 2018/0316407 A1 | 11/2018 | Rahman et al. | |
| 2019/0260429 A1* | 8/2019 | Xu | H04L 5/0057 |
| 2020/0235791 A1* | 7/2020 | Raghavan | H04W 72/046 |
| 2021/0028828 A1* | 1/2021 | Kurras | H04W 72/046 |
| 2021/0068123 A1* | 3/2021 | Zhu | H04W 72/085 |

* cited by examiner

USER EQUIPMENT INITIATED CHANNEL STATE FEEDBACK CODEBOOK SELECTION

BACKGROUND

Technical Field

The present disclosure relates generally to communication systems, and more particularly, to a wireless communication system between a base station and a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A UE may report channel state information (CSI) to a base station using one of two types of spatial information feedback: Type I CSI feedback and Type II CSI feedback. Type I CSI feedback is a CSI feedback scheme that comprises codebook-based precoding matrix indicator (PMI) feedback with normal spatial resolution in beamforming, while Type II CSI feedback is an enhanced CSI feedback scheme that enables codebook-based feedback with higher spatial resolution in beamforming than Type I CSI feedback. Although Type II CSI feedback only allows a UE to report a rank indication (RI) of at most 2, this feedback scheme can provide higher throughput through improved beamforming and resource allocation than Type I CSI feedback by bringing more beamforming gain and separating users with higher granularity. Thus, Type II CSI feedback may be useful for multiple-user-multiple-input-multiple-output (MU-MIMO) deployment scenarios, for scenarios where the signal may be scattered (e.g. multipath), for situations where interference by other UEs may require highly granular beamforming directed toward the UE, for UE located at cell edges, etc.

However, the complexity for a UE in computing PMI for a Type II codebook may be significantly higher than that of a Type I codebook. While PMI for Type I CSI feedback is generally computed based on a single beam, PMI for Type II CSI feedback is generally computed based on the weighted sum of multiple discrete Fourier transform (DFT) beams, the value of which is comprised of the summation of the products of different wideband amplitudes, subband amplitudes, and cophasing for each beam over a number of beams L. Such CSI feedback uses significant computational power of the UE. Moreover, Type II CSI feedback may have a large overhead compared to Type I CSI feedback, since a UE using Type II CSI feedback must report the indices of L DFT beams for each layer, polarization, and beam, as well as the wideband amplitude scale, subband amplitude scale, and cophasing for each beam to the base station. With such a relatively large payload size, a UE may spend significant transmission power as well as computational power in reporting Type II CSI feedback to the base station. It can thus be challenging for a UE to determine the optimal parameters for precoding based on the size of the allowed codebook for Type II CSI feedback.

Thus, while Type II CSI feedback may be beneficial in situations where there are many other users or where the UE is at the cell edge, this feedback scheme may be less efficient in scenarios where higher spatial resolution may not be necessary. For example, Type II CSI feedback may have less performance gain in situations where the UE is located close to the base station, where there is not much interference by other UEs, or in single-user-multiple-input-multiple-output (SU-MIMO) deployments. In such cases, the gain may not outweigh the burdens of relatively large overhead and significant UE computational complexity. Hence, it would be desirable for UEs to be allowed to determine based on the channel condition whether to use a Type II codebook or to revert back to a Type I codebook when performing the CSI feedback procedure and PMI selection. Moreover, when a base station allocates uplink resources based on Type II CSI feedback for a UE to transmit precoding information in uplink control information (UCI), it would be desirable to allow the UE to signal Type I precoding information in a format that fits within the allocated resources (e.g. container) for Type II CSI feedback when the UE has determined to revert back to a Type I codebook.

In this regard, the present disclosure allows UEs to identify scenarios where Type I CSI feedback and Type II CSI feedback would deliver similar spectral throughput/performance based on one or more antenna configurations or channel conditions. These antenna configurations or channel conditions may include any of a low number of antenna ports (e.g. for transmitting CSI reference signals (CSI-RS)), a high antenna correlation, a low number of configured beams for Type II CSI feedback, a high signal to noise ratio (SNR) range, a high number of MU-MIMO users (i.e. high interference layers), and/or flat fading and an absence of interference by paired users. Accordingly, the present disclosure enables a UE to save computational power, transmission power, and/or overhead when computing and reporting CSI feedback when a base station configures a UE to use a Type II codebook, by presenting ways for a UE to determine whether to use a Type I codebook instead if it detects one or more of the aforementioned antenna configurations or channel conditions. Moreover, the present disclosure provides a signaling format for a UE that is configured for Type II CSI feedback to send information based on a selected Type I codebook. In particular, when a UE determines to fall back to a Type I single panel codebook, the UE may report Type I codebook-based PMI in the payload intended to signal Type II codebook-based PMI when transmitting CSI feedback in UCI.

In an aspect of the disclosure, a method, a computer-readable medium, and an apparatus are provided. The apparatus receives a configuration from a base station to transmit channel state feedback (CSF) using a first codebook type; determines whether to transmit the CSF using the first codebook type or a second codebook type; and transmits the CSF using a selected codebook type based on a determination of whether to transmit the CSF using the first codebook type or the second codebook type.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
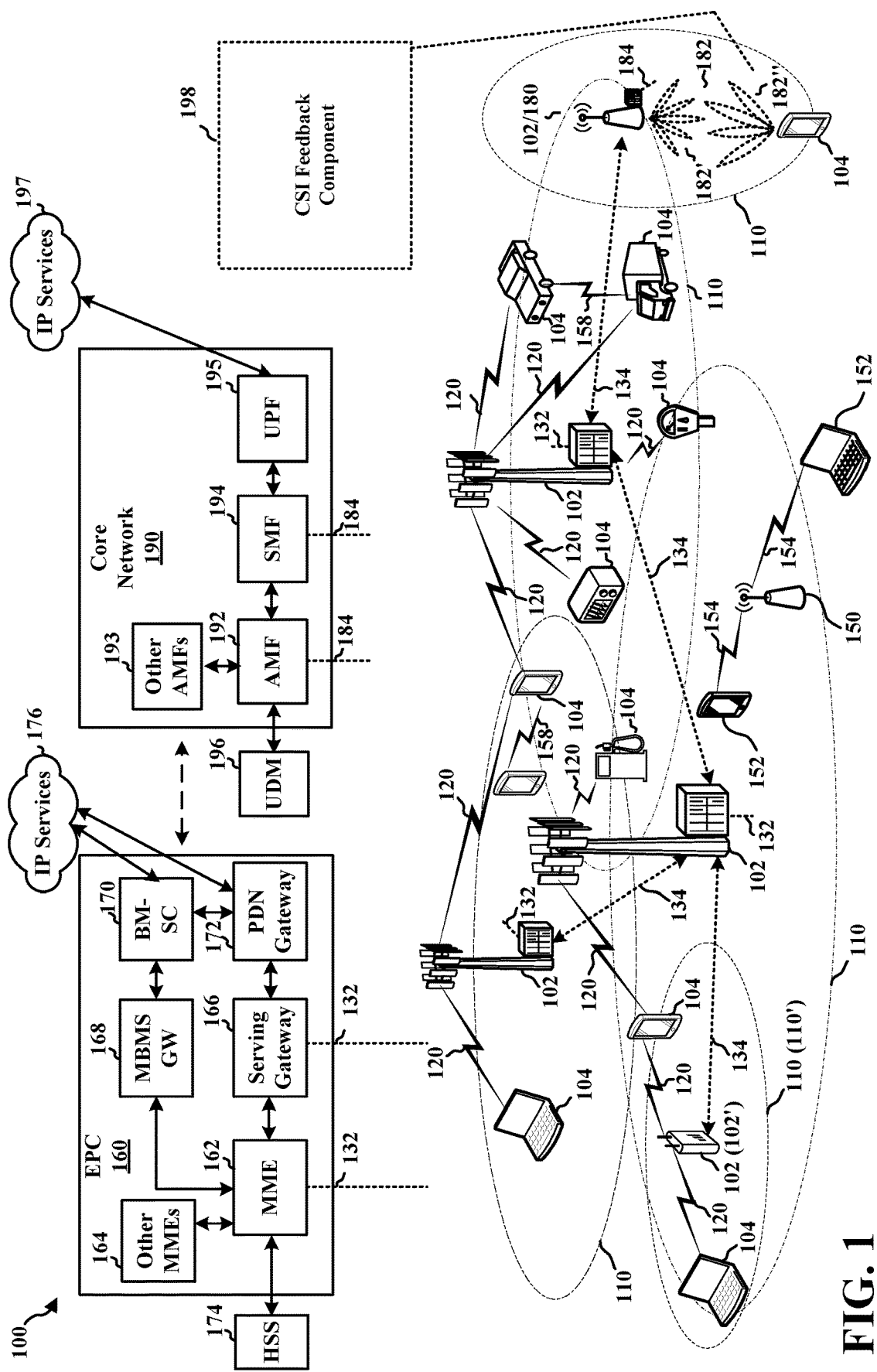
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a CSI feedback component 198 which is configured to receive a configuration from a base station to transmit channel state feedback (CSF) using a first codebook type; determine whether to transmit the CSF using the first codebook type or a second codebook type; and transmit the CSF using a selected codebook type based on a determination of whether to transmit the CSF using the first codebook type or the second codebook type. Although the following description may be focused on 5G NR, the concepts described herein may be applicable to other similar areas, such as LTE, LTE-A, CDMA, GSM, and other wireless technologies.

Figure 2:
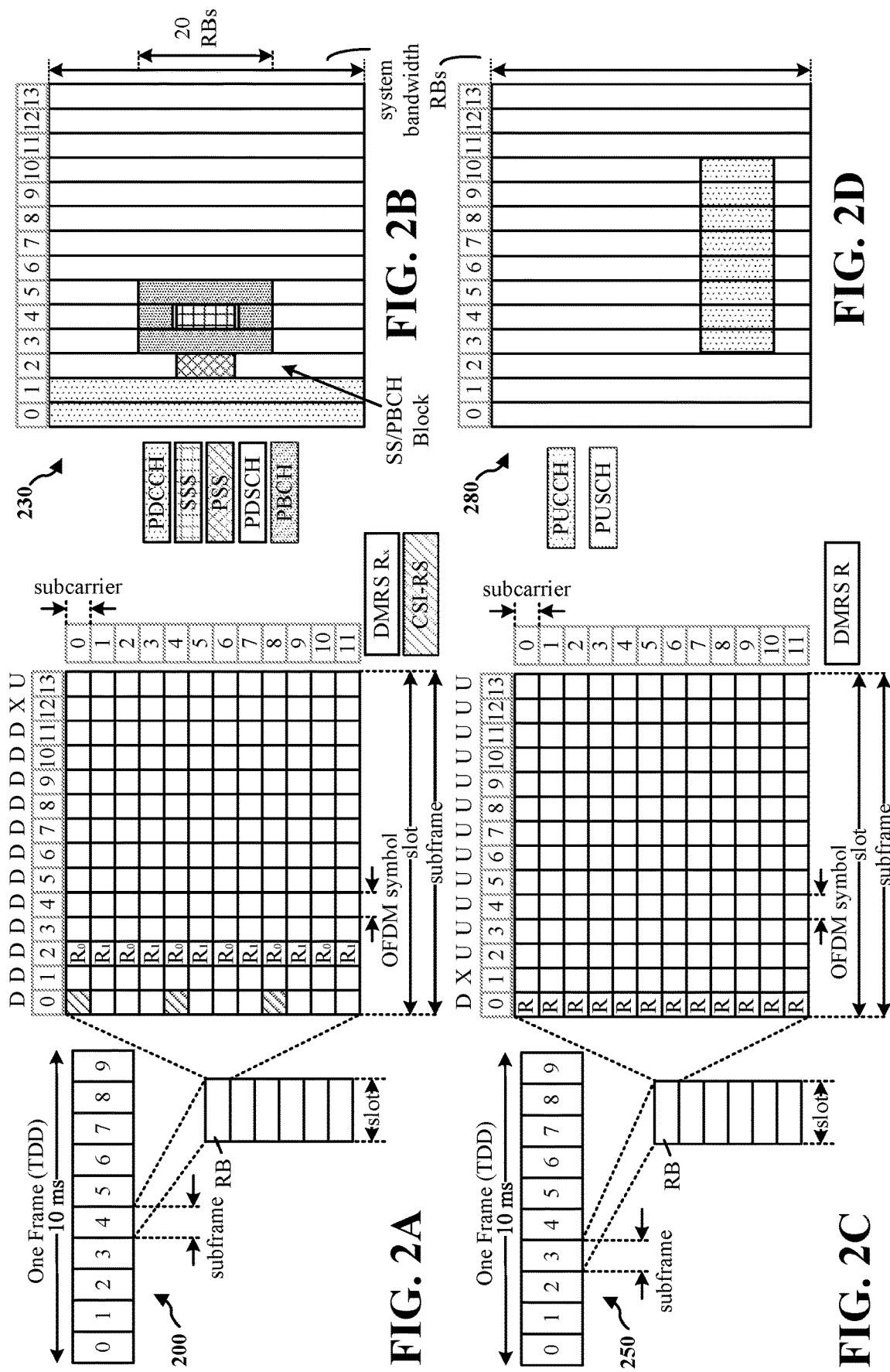
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
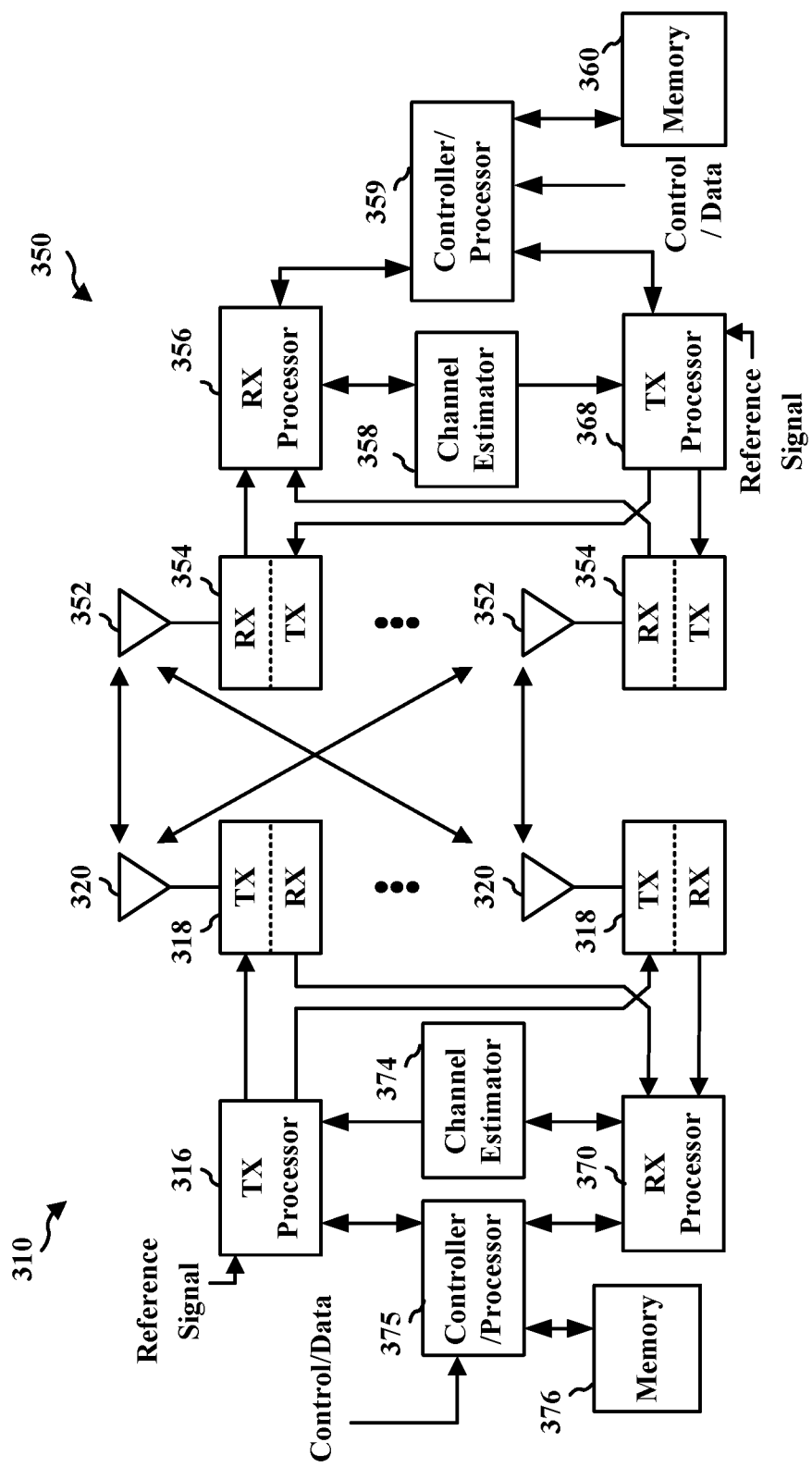
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
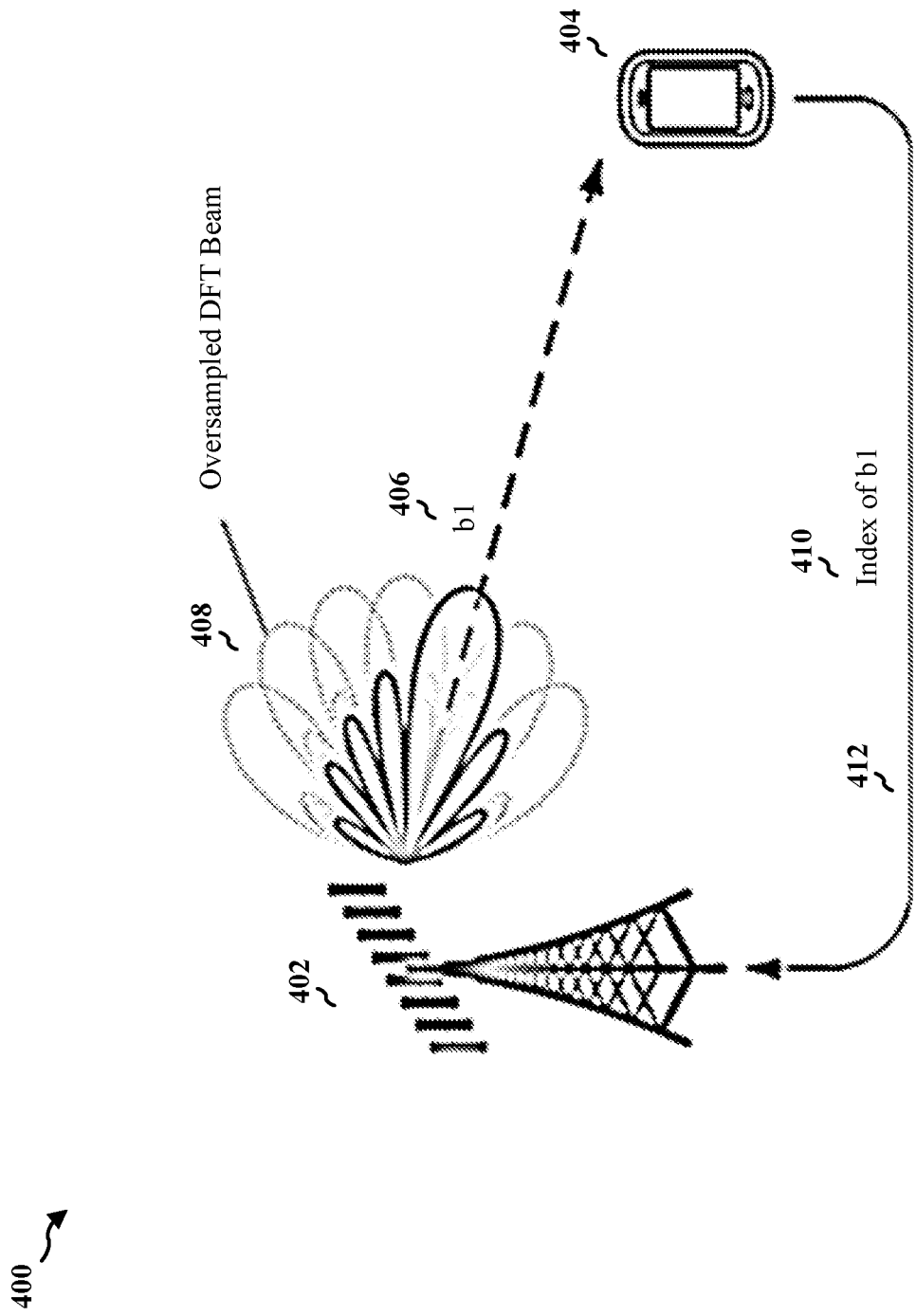
FIG. 4 is a diagram illustrating an example of beam selection with Type I CSI feedback.

A UE may report channel state information (CSI) to a base station using one of multiple types of spatial information feedback, e.g., Type I CSI feedback or Type II CSI feedback. Type I CSI feedback is a CSI feedback scheme which consists of codebook-based precoding matrix indicator (PMI) feedback with a first level of spatial resolution in beamforming. FIG. 4 is a diagram 400 illustrating an example of beam selection with Type I CSI feedback. A base station 402 in communication with a UE 404 selects a most preferred beam $b_1$ 406 (e.g. the strongest beam) from among candidates of oversampled discrete Fourier transform (DFT) beams 408. The base station 402 may configure the UE 404 to perform CSI feedback using a Type I codebook based on an index 410 of the beam $b_1$ 406 sent to the UE 404. The UE 404 may subsequently reference this index 410 when computing precoding information based on a Type I codebook, and when reporting CSI feedback 412 based on the Type I codebook to the base station 402.

In one aspect of precoding design, Type I CSI feedback supports transmissions of at most rank 8 and supports various possible UE antenna configurations. Type I CSI feedback also supports a single stage codebook for up to two ports, or a dual stage codebook for up to four ports. When a dual stage codebook is used, the PMI codebook assumes a $W=W_1W_2$ precoder structure, where:

$W_1$ is the long-term/wideband properties of the channel and has the following format:

$$W_1 = \begin{bmatrix} B & 0 \\ 0 & B \end{bmatrix},$$

B is composed of L oversampled two-dimensional (2D) Discrete Fourier Transform (DFT) beams, and $W_2$ captures the short-term/subband properties of the channel, including beam selection/cophasing of polarization.

The relationship between rank and L number of beams is illustrated in Table 1:

TABLE 1

| Rank | L |
|------|---|
| 1/2  | {1, 4} |
| 3/4  | {1} |

Furthermore, the precoding matrix for a Type I single panel codebook can be summarized as:

$$W = \frac{1}{\sqrt{2vN_1N_2}} \begin{bmatrix} w_{0,0} & w_{0,1} & \cdots & w_{0,v-1} \\ w_{1,0} & w_{1,1} & \cdots & w_{1,v-1} \end{bmatrix},$$

where:
a given v denotes the layers.
Depending on the rank and the number of CSI-RS ports, the following definitions shown in Table 2 may apply:

TABLE 2

| Rank | | $w_{r,v}$ |
|------|---|-----------|
| 1 | | $b_{k_1,k_2} \times c_{r,v}$ |
| 2 | | $b_{k_1+k_1',k_2+k_2'} \times c_{r,v}$ |
| 3/4 | $N_{Tx} < 16$ | $b_{k_1+k_1',k_2+k_2'} \times c_{r,v}$ |
|     | $N_{Tx} \geq 16$ | $\begin{bmatrix} b'_{k_1,k_2} \\ \psi_{m,l}b'_{k_1,k_2} \end{bmatrix} \times c_{r,v}$ | where: $b'_{k_1,k_2}$ is an oversampled 2D DFT beam of length $$\frac{N_1}{2}N_2,$$

while $b_{k_1+k'_{1,j},k_2+k'_{2,j}}$ and $b_{k_1,k_2}$ have a length $N_1N_2$, $c_{r,v}$ is the cophasing coefficient between polarization, and $\psi_{m,l}$ is the cophasing coefficient between antenna groups.

Thus, referring back to FIG. 4, when the UE 404 computes the CSI feedback 412 based on a Type I single panel codebook, the UE 404 may calculate the following precoding vector for the $\ell$ th layer:

$$W_\ell = \begin{pmatrix} b \\ \phi \cdot b \end{pmatrix},$$

where:

b is an oversampled DFT beam, with upper b corresponding to a first polarization of the beam (for example, a +45 degree polarity), and lower b corresponding to a second polarization indicating a cophasing of the beam (for example, a −45 degree polarity), with ϕ representing the value for the cross-polarity cophasing.

Alternatively, a UE may report CSI using Type II CSI feedback, which is an enhanced CSI feedback scheme that enables codebook-based feedback with higher level of spatial resolution in beamforming than Type I CSI feedback. Although Type II CSI feedback allows a UE to report a rank indication (RI) of at most 2, this feedback scheme can provide higher throughput through improved beamforming and resource allocation than Type I CSI feedback by bringing more beamforming gain and separating users with higher granularity. Thus, Type II CSI feedback may be useful for multiple-user-multiple-input-multiple-output (MU-MIMO) deployment scenarios, for scenarios where the signal may be scattered (e.g. multipath), for situations where interference by other UEs may require highly granular beamforming directed toward the UE, and for UE located at cell edges.

Figure 5:
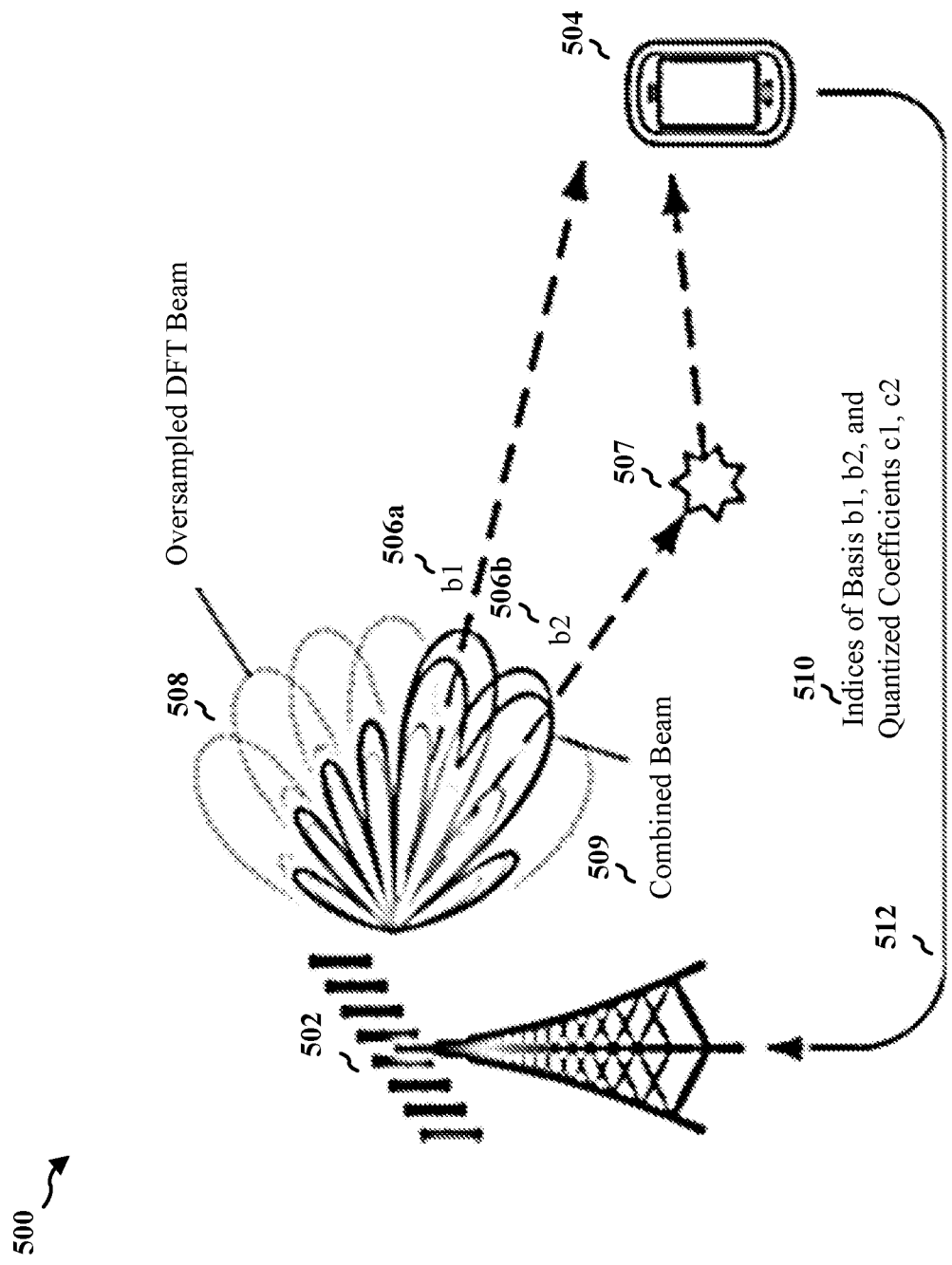
FIG. 5 is a diagram illustrating an example of beam combination including Type II CSI feedback.

For example, FIG. 5 is a diagram 500 illustrating an example of beam combination including Type II CSI feedback in a multipath scenario. A base station 502 in communication with a UE 504 selects beams $b_1$ 506a and $b_2$ 506b from among candidates of oversampled DFT beams 508. However, in this example, one or more beams (e.g. beam $b_2$ 506b) may be scattered by an interfering object 507. Accordingly, the base station combines the beams $b_1$ 506a and $b_2$ 506b into a stronger, preferred beam 509 represented by the value $c_1b_1+c_2b_2$, where $c_1$ and $c_2$ are quantized coefficients multiplied by the indices of basis $b_1$ and $b_2$, respectively. The base station 502 may configure the UE 504 to perform CSI feedback using a Type II codebook based on the indices 510 of beams $b_1$ 506a and $b_2$ 506b sent to the UE 504. The UE 504 may reference these indices 510 when computing PMI based on the Type II codebook and sending Type II CSI feedback 512 to the base station 502.

Unlike Type I CSI feedback, Type II CSI feedback may be supported for rank 1 and 2 UE transmissions only. Moreover, the Type II codebook for computing PMI assumes the following precoder structure:

$\tilde{w}_{r,l} = \sum_{i=0}^{L-1} b_{k_1(i),k_2(i)} \cdot p_{r,l,i}^{(WB)} \cdot p_{r,l,i}^{(SB)} \cdot c_{r,l,i}$ where:

$b_{k_1,k_2}$ is an oversampled 2D DFT beam, r=0,1 (polarization), l=0,1 (layer), $p_{r,l,i}^{(WB)}$ is the wideband (WB) beam amplitude scaling factor (e.g. 3 bits), $p_{r,l,i}^{(SB)}$ is the subband (SB) beam amplitude scaling factor (e.g. 1 bit), $c_{r,l,i}$ is the beam combining coefficient (e.g. 2 or 3 bits, configurable), the value of L (number of beams) is configurable (e.g. L∈{2,3,4}), and the amplitude scaling (subband/wideband) and phase scaling factors are independently selected for each beam, polarization, and layer.

Thus, referring back to FIG. 5, when the UE 504 computes the CSI feedback 512 based on the Type II codebook, the UE 504 may calculate the following precoding vector for the $\ell$ th layer:

$$W_\ell = \sum_{i=0}^{L-1} \begin{pmatrix} p_{+,\ell,i}^{(WB)} \cdot p_{+,\ell,i}^{(SB)} \cdot c_{+,\ell,i} \cdot b_i \\ p_{-,\ell,i}^{(WB)} \cdot p_{-,\ell,i}^{(SB)} \cdot c_{-,\ell,i} \cdot b_i \end{pmatrix},$$

where:

$p^{(WB)}$ corresponds to the wideband amplitude and $p^{(SB)}$ corresponds to the subband amplitude, and $p^{(WB)} \cdot p^{(SB)} \cdot c$ are computed per polarity (+/−), per layer ($\ell$), and per beam coefficient (i) over L orthogonal DFT basis $\{b_0, b_1, \ldots, b_{L-1}\}$. The base station 502 may indicate the value of L (for example, 2, 3, or 4 beams) to the UE 504.

Accordingly, based on the different parameters between Type I codebooks and Type II codebooks described above, it can be challenging for a UE to determine the optimal parameters for precoding based on the size of the allowed codebook for Type II CSI feedback. For example, the complexity for a UE in computing PMI for a Type II codebook may be significantly higher than that of a Type I codebook (e.g. at least four times the complexity of Type I codebooks). While PMI for Type I CSI feedback is generally computed only based on a single beam, PMI for Type II CSI feedback is generally computed based on the weighted sum of multiple DFT beams, w, the value of which is comprised of the summation of the products of different wideband amplitudes, subband amplitudes, and cophasing for each beam over a number of beams L. Such CSI feedback uses significant computational power of the UE. Moreover, Type II CSI feedback may have a large overhead compared to Type I CSI feedback (e.g. at most ten times the overhead of Type I CSI feedback), since a UE using Type II CSI feedback must report the indices of L DFT beams for each layer, polarization, and beam, as well as the wideband amplitude scale, subband amplitude scale, and cophasing for each beam to the base station. With such a relatively large payload size, a UE may spend significant transmission power as well as computational power in reporting Type II CSI feedback to the base station.

Thus, while Type II CSI feedback may be beneficial in situations where there are many other users or where the UE is at the cell edge, this feedback scheme may be less efficient in scenarios where higher spatial resolution may not be necessary. For example, Type II CSI feedback may have less performance gain in situations where the UE is located close to the base station, where there is not much interference by other UEs, or in single-user-multiple-input-multiple-output (SU-MIMO) deployments. In such cases, the gain may not outweigh the burdens of relatively large overhead and significant UE computational complexity. Hence, it would be desirable for UEs to be allowed to determine based on the channel condition whether to use a Type II codebook or to revert back to a Type I codebook when performing the CSI feedback procedure and PMI selection. Moreover, when a base station allocates uplink resources (e.g. x amount of bits) based on Type II CSI feedback for a UE to transmit precoding information in uplink control information (UCI), it would be desirable to allow the UE to signal Type I precoding information in a format that fits within the allocated resources (e.g. container) for Type II CSI feedback when the UE has determined to revert back to a Type I codebook.

In this regard, the present disclosure enables UEs to identify scenarios where Type I CSI feedback and Type II CSI feedback would deliver similar spectral throughput/performance based on one or more antenna configurations or channel conditions. These antenna configurations or channel conditions may include a low number of antenna ports (e.g. for transmitting CSI reference signals (CSI-RS)), a high antenna correlation, a low number of configured beams for Type II CSI feedback, a high signal to noise ratio (SNR) range, a high number of MU-MIMO users (i.e. high interference layers), and/or flat fading and an absence of interference by paired users. Accordingly, the present disclosure allows a UE to save significant computational power, transmission power, and/or overhead when computing and reporting CSI feedback when a base station configures a UE to use a Type II codebook, since a UE may determine to use a Type I codebook instead if it detects one or more of the aforementioned antenna configurations or channel conditions. An example of this detection feature are described below with respect to FIGS. 6 and 7. Moreover, the present disclosure provides a signaling format for a UE that is configured for Type II CSI feedback to send information based on a selected Type I codebook. In particular, when a UE determines to fall back to a Type I single panel codebook, the UE may report Type I codebook-based PMI in the payload intended to signal Type II codebook-based PMI when transmitting CSI feedback in UCI. An example of this signaling feature is described below with respect to FIG. 8.

Figure 6:
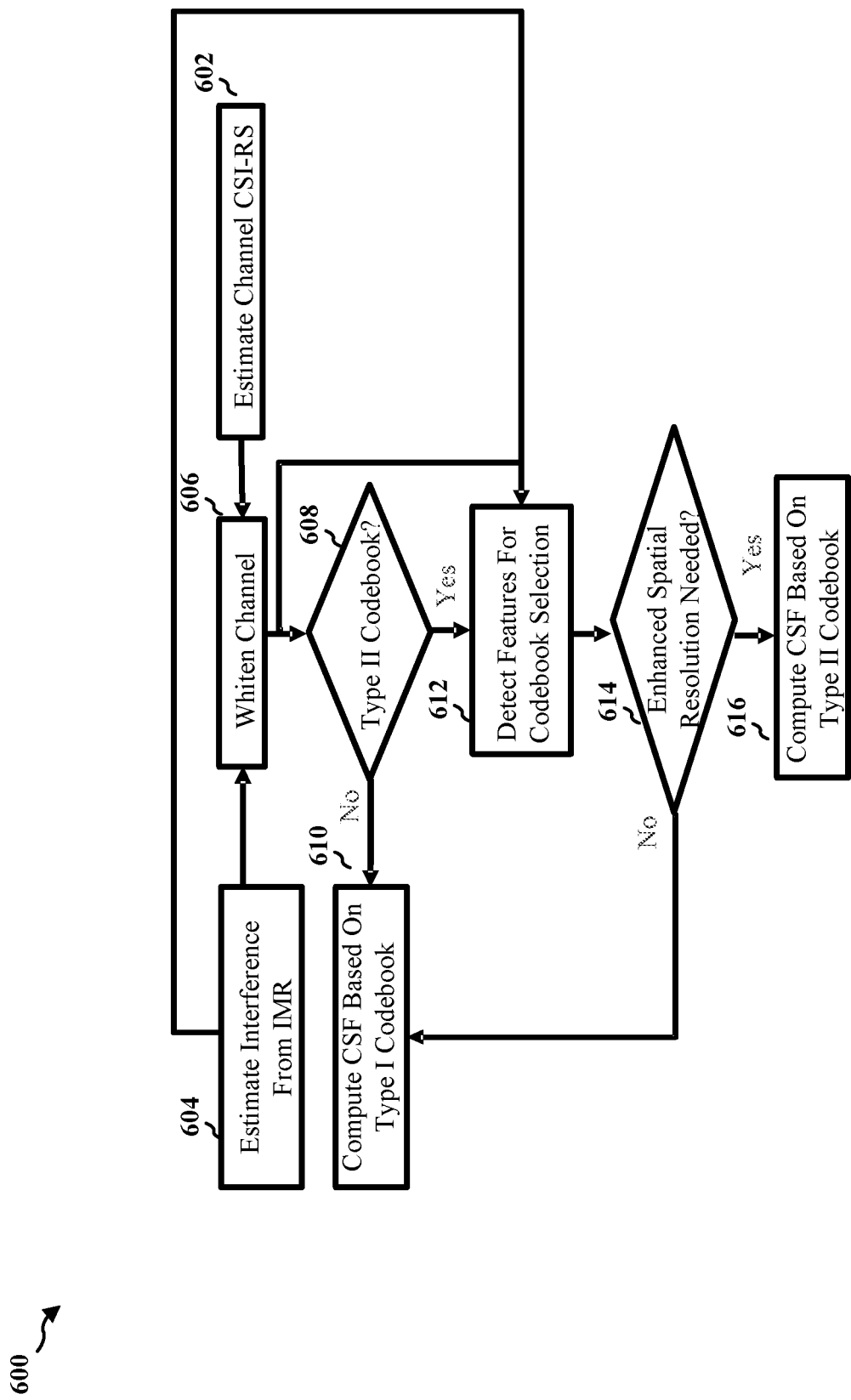
FIG. 6 is an example flow diagram of the CSI feedback procedure performed by a UE.

FIG. 6 illustrates an example flow diagram 600 of the CSI feedback procedure performed by a UE. At 602, the UE first performs channel estimation on a reference signal (e.g. CSI-RS) received from a base station, and at 604, the UE receives interference measurement resources (IMR) from the base station and estimates interference over the channel based on the IMR. Then, at 606, the UE whitens the channel to remove interference to the UE. Subsequently, at 608, the UE determines if the UE has received a configuration from the base station to perform CSI feedback (CSF) using a Type II codebook. This configuration may be received by the UE, for example, through RRC signaling. If the UE determines that it is configured to perform CSF using a Type I codebook, then at 610, the UE computes the CSF based on the Type I codebook, as described in connection with FIG. 4. However, if the UE determines that it is configured to perform CSF using a Type II codebook, then at 612, the UE detects whether any features exist (e.g. antenna configurations or channel conditions) which may impact the performance gain for Type II CSI feedback.

For example, the UE may determine whether there exists one or more of a low number of antenna ports, a high antenna correlation, a low number of configured beams for Type II CSI feedback, a high signal to noise ratio (SNR) range, a high number of MU-MIMO users (i.e. high interference layers), and/or flat fading and an absence of interference by paired users, based on channel conditions of the whitened channel at 606 and interference estimated at 604. In one aspect, Type II CSI feedback may result in less gain for UEs whose number of antenna ports transmitting CSI-RS is smaller than an antenna port threshold. The antenna port threshold may be, for example, 2, 4, or 8 antenna ports (e.g. Type II CSI feedback may be less useful if the number of CSI-RS antenna ports is 8 or less). In another aspect, Type II CSI feedback may result in less gain for UEs having an antenna correlation higher than an antenna correlation threshold. The antenna correlation threshold may be, for example, 0.5 in. (e.g. Type II CSI feedback may be less useful if the antenna correlation is >0.5 in.). In a further aspect, Type II CSI feedback may result in less gain for UEs having a number of beams L configured for this feedback scheme which is lower than a beam threshold. The beam threshold may be, for example, 3 beams (e.g. Type II CSI feedback may be less useful if L<3). In another aspect, Type II CSI feedback may result in less gain for UEs having a SNR range greater than a SNR threshold. The SNR threshold may be, for example, 20 dB (e.g. Type II CSI feedback may be less useful at SNR ranges above 20 dB). In a further aspect, Type II CSI feedback may result in less gain in situations where there is a high number of MU-MIMO users (i.e. there is a high level of interference on multiple layers). In an additional aspect, Type II CSI feedback may result in less gain for UE transmissions experiencing flat fading, or in scenarios where there is an absence of interference by other users or there are no paired users to the UE.

After performing the feature detection or identification, the UE may determine at 614 whether enhanced spatial resolution is needed for CSI feedback based on the identified antenna configuration(s) or channel condition(s). For example, the UE may determine at 614 that enhanced spatial resolution is unnecessary where the number of antenna ports transmitting CSI-RS is smaller than an antenna port threshold, where the UE has an antenna correlation higher than an antenna correlation threshold, where the UE transmits using a number of beams L which is lower than a beam threshold, where the SNR range is greater than a SNR threshold, where there is a high number of MU-MIMO users, or where there is flat fading, an absence of interference by other users, or a lack of paired users to the UE. In such case, at 610, the UE computes CSF based on the Type I codebook instead, thereby saving computational power, transmission power, overhead, and complexity in precoding for CSI feedback. Otherwise, at 616, the UE computes CSF based on the Type II codebook if none of the aforementioned features are present which could reduce the performance gain of Type II CSI feedback.

Figure 7:
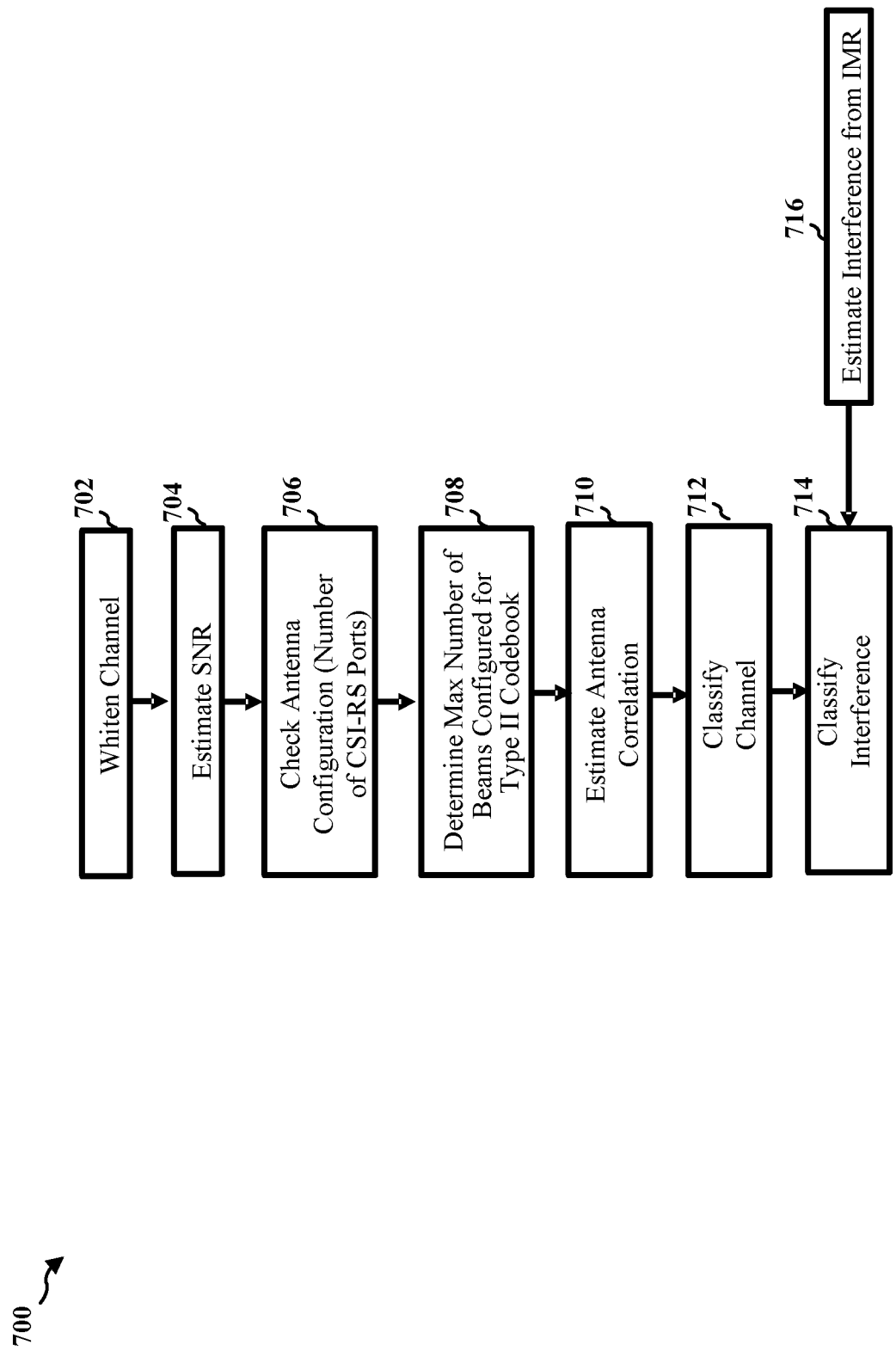
FIG. 7 is a flow diagram of an example of a feature detection procedure performed by a UE.

FIG. 7 illustrates a flow diagram 700 of an example of the feature detection procedure which the UE performs at 612 and/or 614 of FIG. 6. At 702, the UE whitens the channel to remove all visible interference at the UE. This step may correspond to step 606 of FIG. 6. At 704, the UE estimates the SNR of the channel. If the estimated SNR is greater than a SNR threshold (for example, the SNR ranges above 20 dB or another number), the UE may determine at 614 of FIG. 6 that enhanced spatial resolution is not needed and computes CSF based on the Type I codebook instead.

At 706, the UE checks the configuration of its antenna ports to determine the number of CSI-RS ports. If the number of antenna ports transmitting CSI-RS is lower than an antenna port threshold (for example, the number of CSI-RS antenna ports is 8 or less), the UE may determine at 614 of FIG. 6 that enhanced spatial resolution is not needed and computes CSF based on the Type I codebook instead. At 708, the UE determines the maximum number of beams which the base station has configured for a Type II codebook. If the number of configured beams L is lower than a beam threshold (for example, L<3), the UE may determine at 614 of FIG. 6 that enhanced spatial resolution is not needed and computes CSF based on the Type I codebook instead. At 710, the UE estimates its antenna correlation. If the UE's antenna correlation is higher than an antenna correlation threshold (for example, the antenna correlation>0.5 or another number), the UE may determine at 614 of FIG. 6 that enhanced spatial resolution is not needed and computes CSF based on the Type I codebook instead.

At 712, the UE determines a channel classification. For example, the UE may determine whether the channel is subject to flat fading. If flat fading exists, the UE may determine at 614 of FIG. 6 that enhanced spatial resolution is not needed and computes CSF based on the Type I codebook instead. Finally, at 714, the UE determines an interference classification. For example, the UE may determine whether there is a high number of MU-MIMO users, whether there is an absence of interference by other users, or whether there are no paired users to the UE based on the received IMR from the base station and the estimated interference over the channel at 716. The reception of IMR and estimated interference based on the IMR may correspond to step 604 of FIG. 6. The UE may consider any combination of the aspects described in connection with FIG. 7.

In the aforementioned cases, the UE may determine at 614 of FIG. 6 that enhanced spatial resolution is not needed and computes CSF based on the Type I codebook instead. Once the UE has determined that enhanced spatial resolution is not necessary and has decided to fall back to a Type I codebook as described above, the UE may signal the precoding information to the base station in the PMI payload of UCI for a Type II codebook. Generally for Type II precoder signaling, the wideband (WB) amplitude, subband (SB) amplitude, and SB phase are quantized and reported in (X, Y, Z) bits as follows:

For each layer, for the leading (strongest) coefficient out of 2L coefficients, (X, Y, Z)=(0,0,0), where the leading (strongest) coefficient=1.

For WB+SB amplitude, (X, Y)=(3,1) and Z∈{2,3} for the first (K−1) leading (strongest) coefficients out of (2L−1) coefficients, and (X, Y, Z)=(3,0,2) for the remaining (2L−K) coefficients. For L=2, 3, and 4, the corresponding value of K is 4 (=2L), 4, and 6, respectively. The coefficient index information reported in a WB manner includes: the index of the strongest coefficient out of 2L coefficients (per layer), and the (K−1) leading coefficients are determined implicitly from the reported (2L−1) WB amplitude coefficients per layer without additional signaling.

For WB-only amplitude, i.e. Y=0, (X, Y)=(3, 0) and Z∈{2,3}, and the index of the strongest coefficient out of 2L coefficients is reported per layer in a WB manner.

However, as such reporting typically includes the indices of L DFT beams for each layer, polarization, and beam, as well as the wideband amplitude scale, subband amplitude scale, and cophasing for each beam, significant overhead and transmission power may be used unnecessarily when reporting Type II CSI feedback to the base station in scenarios with limited performance gain. Therefore, the present disclosure allows the UE to signal the Type I precoding information in a format that fits within the allocated resources (e.g. container) for Type II CSI feedback.

Figure 8:
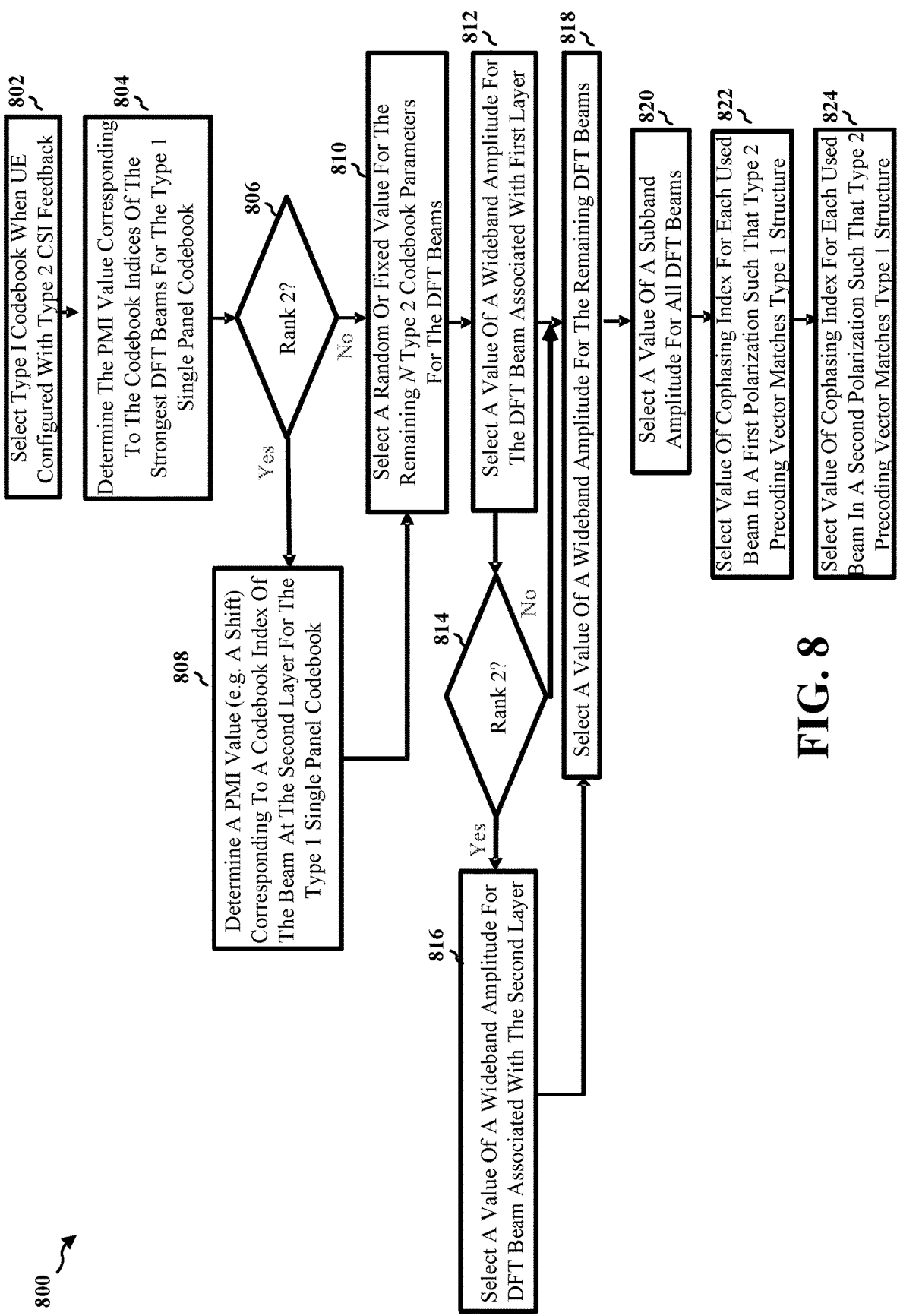
FIG. 8 is a flow diagram of an example of a CSF computation procedure performed by a UE.

FIG. 8 illustrates a flow diagram 800 of an example of the CSF computation which the UE performs at 610 of FIG. 6 after determining that enhanced spatial resolution is not necessary and falling back to a Type I codebook. At 802, the UE configured for Type II CSI feedback first selects the Type I codebook for computing and sending CSI feedback. This step may correspond to step 610 of FIG. 6. Then, at 804, the UE determines the PMI value corresponding to the codebook indices of the strongest DFT beams for the Type I single panel codebook. In particular, the UE may determine the codebook indices $i_{1,1}$, $i_{1,2}$ of a Type I single panel codebook for each beam based on the number of CSI-RS antenna ports and the number of beams or layers used for CSI reporting. The UE may then determine whether these indices are correctly mapped to the corresponding codebook indices $i_{1,1}$, $i_{1,2}$ of a Type II codebook. For example, the UE may confirm that the values of $i_{1,1}$ fit within a predefined set of elements for Type II codebook parameters $q_1$ and $q_2$, whose values are defined based on the number of CSI-RS antenna ports. Moreover, the UE may confirm that the values of $i_{1,2}$ fit within a predefined set of elements based on Type II codebook parameters $n_1^0$ and $n_2^0$, whose values correspond to a first beam of L beams and are also defined based on the number of CSI-RS antenna ports. If the RI is 1, the UE may report the codebook indices of only one DFT beam in CSI feedback, while if the RI is 2, the UE may report the codebook indices of two DFT beams in CSI feedback.

At 806, the UE determines whether the rank is 2 (e.g. RI=2). If so, then at 808, the UE also determines a PMI value (e.g. a shift) corresponding to a codebook index of the beam at the second layer (e.g. $i_{1,3}$) for the Type I single panel codebook. In particular, the UE may determine the codebook index $i_{1,3}$ for the beam, in addition to codebook indices $i_{1,1}$, $i_{1,2}$, based on the number of CSI-RS antenna ports. The UE may then determine whether these indices are correctly mapped to the corresponding codebook indices of a Type II codebook. For example, the UE may confirm that the values of $i_{1,2}$ fit within a predefined set of elements based on Type II codebook parameters $n_1^1$ and $n_2^1$, whose values correspond to a second beam of L beams and are also defined based on the number of CSI-RS antenna ports.

At 810, the UE selects a random or fixed value for the remaining n Type II codebook parameters for the DFT beams that are not used in computing PMI for Type I single panel codebooks. For example, if the number of beams L configured by the base station is greater than the rank indicator (for example, L=4 but RI=2), the UE may set the corresponding Type II codebook parameters associated with the unused beams (e.g. $n_1^2$ and $n_2^2$ for the third beam and $n_1^3$ and $n_2^3$ for the fourth beam) to any random or fixed value, as these beams may not be used for PMI computation based on Type II codebooks in certain aspects. Therefore, rather than calculating these parameters, the UE may instead substitute random or fixed values, saving significant computational power and time.

At 812, the UE selects a value of a wideband amplitude for the DFT beam associated with the first layer. In one aspect, this value may be '1'. For example, if the number of beams L configured by the base station is greater than the rank indicator (for example, L=4 but RI=1), only one of the four beams will be used (i.e. the beam whose codebook indices $i_{1,1}$, $i_{1,2}$ respectively fit within Type II codebook parameters $q_1$ and $q_2$ and $n_1^0$ and $n_2^0$). Moreover, as described above, while the precoding vector for a Type I codebook may be $$W_\ell = \begin{pmatrix} b \\ \phi \cdot b \end{pmatrix}$$

for each layer, the precoding vector for a Type II codebook may be $$W_\ell = \sum_{i=0}^{L-1} \begin{pmatrix} p_{+,\ell,i}^{(WB)} \cdot p_{+,\ell,i}^{(SB)} \cdot c_{+,\ell,i} \cdot b_i \\ p_{-,\ell,i}^{(WB)} \cdot p_{-,\ell,i}^{(SB)} \cdot c_{-,\ell,i} \cdot b_i \end{pmatrix}$$

for each layer. Thus, in order to fit the PMI values computed for the Type I single panel codebook into the format/container for the Type II codebook (i.e. converting the equation of the Type II precoding vector into that of the Type I precoding vector), the UE may set the wideband amplitude coefficients $p_{+,\ell,i}^{(WB)}$ and $p_{-,\ell,i}^{(WB)}$ for each used beam i to 1.

At 814, the UE determines whether the rank is 2 (e.g. RI=2). In such case, two of the four beams in the example above are being used, where the beam associated with the second layer may be the beam whose codebook index $i_{1,2}$ respectively fits within Type II codebook parameters $n_1^1$ and $n_2^1$. If the rank is 2, then at 816, the UE selects a value of a wideband amplitude for the DFT beam associated with the second layer. In one aspect, this value may also be '1'. As in 810, in order to fit the PMI values computed for the Type I single panel codebook into the format/container for the Type II codebook, the UE may set the wideband amplitude coefficients $p_{+,\ell,i}^{(WB)}$ and $p_{-,\ell,i}^{(WB)}$ for each used beam i (including the second beam) to 1.

Moreover, at 818, the UE selects a value of a wideband amplitude for the remaining DFT beams, other than those used at 812 or 814. In one aspect, this value may be '0'. In the example above where L=4 but RI=2, two of the four beams will be unused. Therefore, in order to fit the PMI values computed for the Type I single panel codebook into the format/container for the Type II codebook, the UE may set the wideband amplitude coefficients $p_{+,\ell,i}^{(WB)}$ and $p_{-,\ell,i}^{(WB)}$ for each unused beam i (including the third and fourth beams) to 0.

At 820, if subband amplitude is enabled (e.g. as indicated by the base station using higher layer parameter subbandAmplitude or by any other name), the UE selects a value of a subband amplitude for all DFT beams (which may include used and unused beams). In contrast to Type II codebooks, Type I single panel codebooks may not use subband amplitude coefficients in calculating the precoding vector for PMI in certain aspects. Therefore, in order to fit the PMI values computed for the Type I single panel codebook into the format/container for the Type II codebook, the UE may set the subband amplitude coefficients $p_{+,\ell,i}^{(SB)}$ and $p_{-,\ell,i}^{(SB)}$ for each beam i to 1. In this way, subband amplitude may be essentially read out of the Type I precoding matrix.

At 822, the UE selects a value of a cophasing index for each layer associated with each used beam in a first polarization such that the Type II precoding vector matches the Type I structure. In one aspect, this value may be 1 for used beams, and 0 (or another number) for unused beams. For example, in order to fit the PMI values computed for the Type I single panel codebook into the format/container for the Type II codebook, the UE may set the quantity $c_{+,\ell,i}$ for each used beam i to 1, while setting that quantity for each unused beam to 0. Alternatively, if the WB amplitude coefficient of unused beams were previously set to 0 at 816, the quantity $c_{+,\ell,i}$ for each unused beam can be set any number, producing the same zero product result.

Similarly, at 824, the UE selects a value of a cophasing index for each layer associated with each used beam in a second polarization such that the Type II precoding vector also matches the Type I structure. In one aspect, this value may be φ as defined for the Type I codebook. For example, in order to fit the PMI values computed for the Type I single panel codebook into the format/container for the Type II codebook, the UE may set the quantity $c_{-,\ell,i}$ for each used beam i to φ. The UE may also set that quantity for each unused beam to 0 or some other number as described above at 820.

In this way, the UE can construct the smaller, precoding vector matrix referenced above with respect to FIG. 4 for Type I codebooks when calculating the precoding vector based on the larger, precoding vector matrix referenced above with respect to FIG. 5 for Type II codebooks. The UE can thus report CSI feedback based on the Type I codebook within the Type II precoder structure or container.

Figure 9:
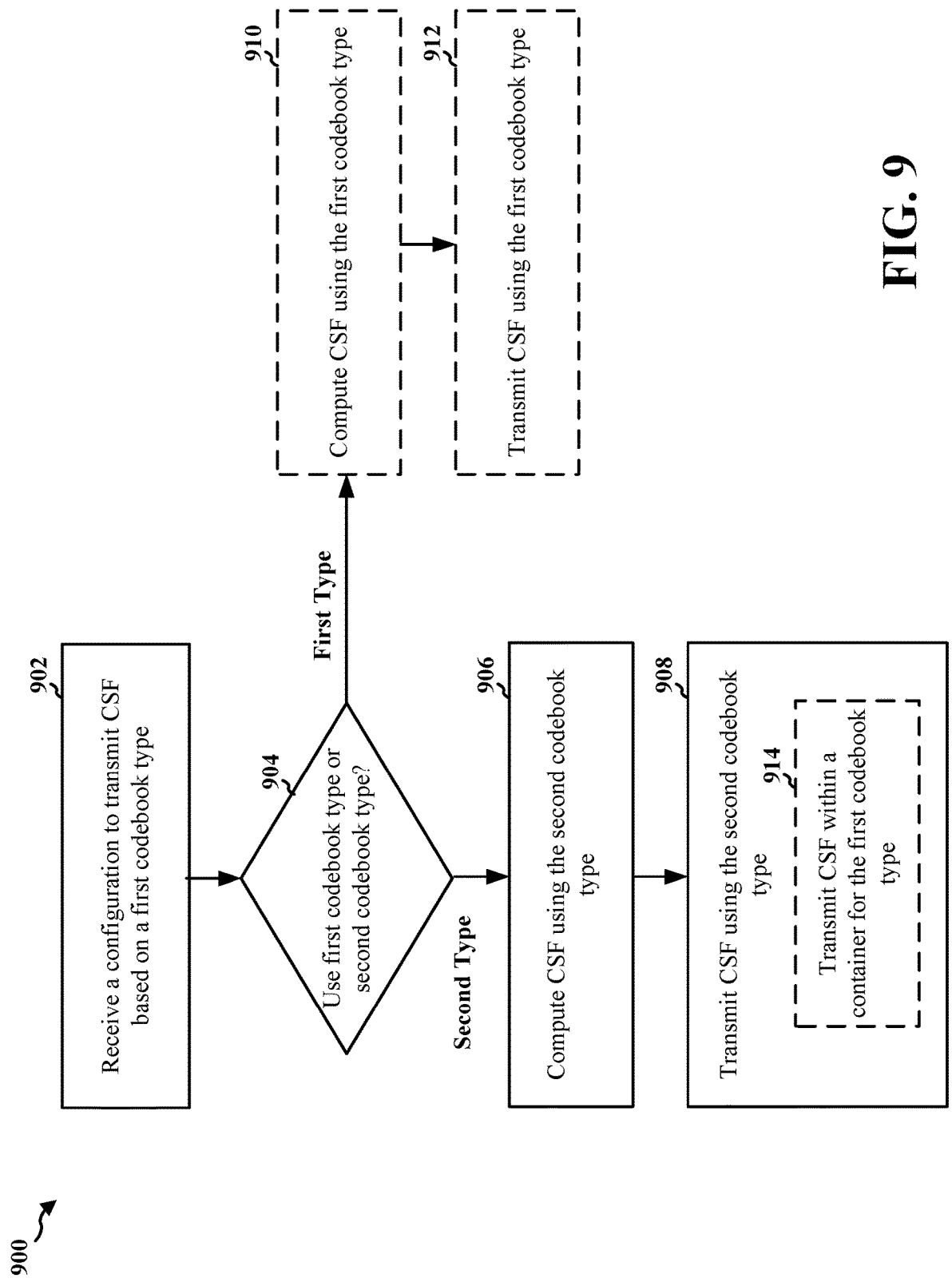
FIG. 9 is a flowchart of a method of wireless communication.

FIG. 9 is a flowchart 900 of a method of wireless communication. The method may be performed by a UE or a component of a UE (e.g., the UE 104, 350, 404, 504; the apparatus 1002/1002'; the processing system 1114, which may include the memory 360 and which may be the entire UE 350 or a component of the UE 350, such as the TX processor 368, the RX processor 356, and/or the controller/processor 359). Optional aspects are illustrated with a dashed line. The method may enable the UE to make more efficient use of power and wireless resources by selecting a codebook type for CSF that requires less complexity and overhead in some situations.

At 902, the UE receives a configuration from a base station to transmit CSF using a first codebook type. The first codebook type may comprise a Type II codebook. For example, configuration component 1008 and/or reception component 1004 of apparatus 1002 may receive the configuration from base station 1050. For instance, referring to FIG. 5, the base station 502 may configure the UE 504 to perform CSI feedback using a Type II codebook based on the indices 510 of beams b1 506a and b2 506b sent to the UE 504.

At 904, the UE determines whether to transmit the CSF using the first codebook type or a second codebook type. For example, determination component 1010 of apparatus 1002 may perform the determination. The second codebook type may comprise a Type I codebook. As an example, the UE may determine whether to use a Type II codebook that the UE has been configured to use or to use a Type I codebook. The UE may determine to transmit the CSF using the second codebook type (e.g., a Type I codebook) based, at least in part, on an antenna configuration and/or a channel condition. For instance, referring to FIG. 6, at 612, the UE detects whether any features exist (e.g. antenna configurations or channel conditions) which may impact the performance gain for Type II CSI feedback. As described with reference to FIG. 7, the UE may determine whether there exists one or more of a low number of antenna ports, a high antenna correlation, a low number of configured beams for Type II CSI feedback, a high signal to noise ratio (SNR) range, a high number of MU-MIMO users (i.e. high interference layers), and/or flat fading and an absence of interference by paired users, based on channel conditions of the whitened channel at 606 and interference estimated at 604 of FIG. 6.

The antenna configuration used to determine the codebook type for CSF may comprise a number of antenna ports. The UE may determine to transmit the CSF using the second codebook type when the number of antenna ports is lower than an antenna port threshold and may determine to transmit the CSF using the first codebook type when the number of antenna ports meets the antenna port threshold. For example, when the UE has a lower number of antenna ports, the UE may determine to use a Type I codebook for CSF. For instance, referring to FIG. 6, the antenna port threshold may be, for example, 2, 4, or 8 antenna ports, and the UE may determine to use a Type I codebook for CSF if the number of CSI-RS antenna ports is less than this threshold.

The antenna configuration used to determine the codebook type for CSF may comprise an antenna correlation. The UE may determine to transmit the CSF using the first codebook type when the antenna correlation is below a correlation threshold and may determine to transmit the CSF using the second codebook type when the antenna correlation exceeds the correlation threshold. For example, when there is a high antenna correlation, the UE may determine to use a Type I codebook for CSF. For instance, referring to FIG. 6, the antenna correlation threshold may be, for example, 0.5 in, and the UE may determine to use a Type I codebook for CSF if the antenna correlation>0.5.

The antenna configuration used to determine the codebook type for CSF may comprise a number of beams configured for the second codebook type. The UE may determine to transmit the CSF using the first codebook type when the number of beams meets a beam threshold and may determine to transmit the CSF using the second codebook type when the number of beams is lower than the beam threshold. For example, the UE may use a Type I codebook for CSF when there is a lower number of beams. For instance, referring to FIG. 6, the beam threshold may be, for example, 3 beams (L=3), and the UE may determine to use a Type I codebook for CSF if L<3.

The channel condition used to determine the codebook type for CSF may comprise an SNR. The UE may determine to transmit the CSF using the first codebook type when the SNR is below an SNR threshold and may determine to transmit the CSF using the second codebook type when the SNR meets the SNR threshold. For example, the UE may determine to use the Type I codebook when there is high SNR. For instance, referring to FIG. 6, the SNR threshold may be, for example, 20 dB, and the UE may determine to use a Type I codebook for CSF if the SNR>=20 dB.

The channel condition used to determine the codebook type for CSF may comprise a number of users communicating based on MU-MIMO. The UE may determine to transmit the CSF using the first codebook type when the number of users is below a user threshold and may determine to transmit the CSF using the second codebook type when the number of users meets the user threshold. For example, if there are a high number of MU-MIMO users, e.g., high interference layers, the UE may determine to use a Type I codebook for CSF.

The channel condition used to determine the codebook type for CSF may comprise at least one of a statistical channel property or interference from other users. The UE may determine to transmit the CSF using the second codebook type based on the statistical channel property or interference. For example, if there is flat fading and/or an absence of interference (e.g., no paired user), the UE may determine to use a Type I codebook for CSF.

Once the UE determines the type of codebook to use, the UE may proceed to compute or determine the CSF to report and may transmit the CSF using the selected codebook type based on the determination, at 904, of whether to transmit the CSF using the first codebook type or the second codebook type. For instance, referring to FIG. 6, the UE may determine at 614 that enhanced spatial resolution is unnecessary where the number of antenna ports transmitting CSI-RS is smaller than an antenna port threshold, where the UE has an antenna correlation higher than an antenna correlation threshold, where the UE transmits using a number of beams L which is lower than a beam threshold, where the SNR range is greater than a SNR threshold, where there is a high number of MU-MIMO users, or where there is flat fading, an absence of interference by other users, or a lack of paired users to the UE. If the UE determines that enhanced spatial resolution is unnecessary, then at 610, the UE computes CSF based on the Type I codebook. Otherwise, at 616, the UE computes CSF based on the Type II codebook.

For example, if the UE determines to use the second codebook type, at 906, the UE may compute the channel state feedback using the second codebook type based on the determination. As described above, the second codebook type may comprise a Type I codebook. Therefore, the UE may measure received CSI-RS and determine feedback based on a Type I codebook. The second CSF calculation component 1012 may perform the computation. For instance, referring to FIG. 6, the UE may determine at 614 that enhanced spatial resolution is not needed for CSI feedback based on the identified antenna configuration(s) or channel condition(s), and at 610, the UE computes CSF based on the Type I codebook described with reference to FIG. 4.

At 908, the UE may transmit the CSF using the second codebook type based on the determination. The second CSF transmission component 1016 and/or transmission component 1006 may transmit the CSF using the second codebook type. The UE may use the second codebook type for the CSF, even though the UE received the configuration for the first codebook type, at 902. As the UE was configured to provide CSF based on the first type of codebook, the UE may transmit the CSF using the second codebook type within a container in UCI for the first codebook type, as illustrated at 914. Container component 1014 of apparatus may format the CSF within a container for the first codebook type. For example, the UE may transmit CSF information based on a Type I codebook that is formatted within a container for a Type II codebook. For instance, as described with reference to FIG. 8, the UE may signal the Type I precoding information in a format that fits within the allocated resources (e.g. container) for Type II CSI feedback.

If the UE instead determines to use the first codebook type for which the UE was configured, at 910, the UE may compute the channel state feedback using the first codebook type. As described above, the first codebook type may comprise a Type II codebook. Therefore, the UE may measure received CSI-RS and determine feedback based on a Type II codebook. The first CSF calculation component 1018 of apparatus 1002 may perform the computation. For instance, referring to FIG. 6, the UE may determine at 614 that enhanced spatial resolution is needed for CSI feedback based on the identified antenna configuration(s) or channel condition(s), and at 616, the UE computes CSF based on the Type II codebook described with reference to FIG. 5.

At 912, the UE may transmit the CSF using the first codebook type based on the determination. The first CSF transmission component 1020 and/or transmission component 1006 may transmit the CSF using the first codebook type. The first codebook type may comprise a corresponding CSF container or structure, as described herein. For instance, referring to FIG. 5, the UE may compute PMI based on the Type II codebook and transmit Type II CSI feedback 512 to the base station 502 accordingly.

Figure 10:
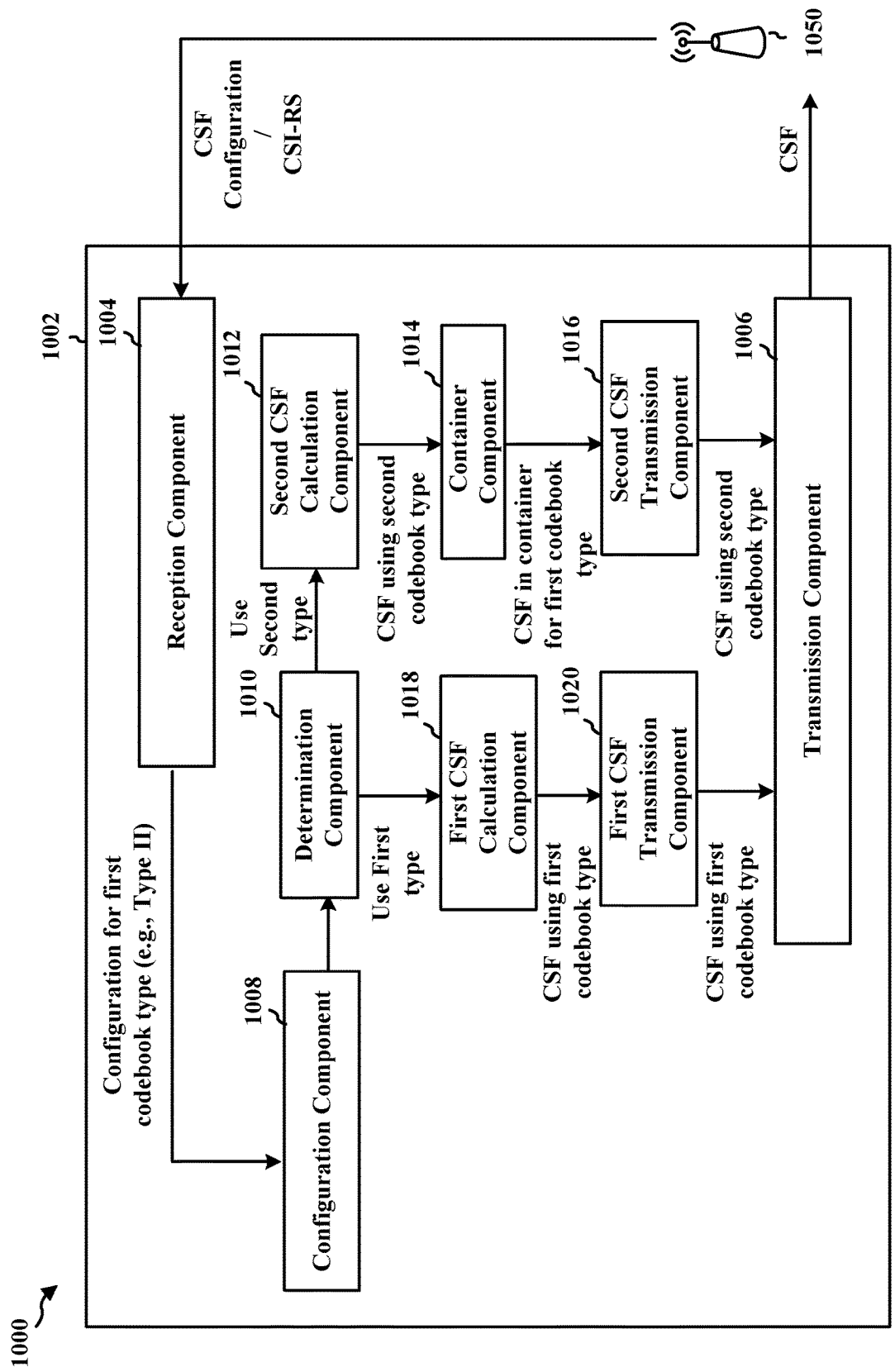
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE. The apparatus includes a reception component 1004 that receives downlink communication from base station 1050 and a transmission component 1006 that transmits uplink communication to the base station 1050. The apparatus may include a configuration component 1008 configured to receive a configuration from a base station to transmit using a first codebook type, e.g., as described in connection with 902 in FIG. 9. The apparatus may include a determination component 1010 configured to determine whether to transmit the CSF using the first codebook type or a second codebook type, e.g., as described in connection with 904 in FIG. 9. The apparatus may further include component(s) configured to transmit the CSF using a selected codebook type based on a determination of whether to transmit the CSF using the first codebook type or the second codebook type, as described in connection with 908 and 912 of FIG. 9. For example, the apparatus may include a first CSF transmission component 1020 configured to transmit the CSF using the first codebook type and a second CSF transmission component 1016 configured to transmit the CSF using the second codebook type. The apparatus may include a second CSF calculation component 1012 configured to compute the channel state feedback using the second codebook type, e.g., when the determination component determines to use the second codebook type, as described in connection with 906 in FIG. 9. The apparatus may include a first CSF calculation component 1018 configured to compute the channel state feedback using the first codebook type based on the determination, e.g., when the determination component determines to use the first codebook type. The apparatus may include a container component 1014 configured to transmit the CSF using the second codebook type within a container in UCI for the first codebook type, e.g., as described in connection with 914 in FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
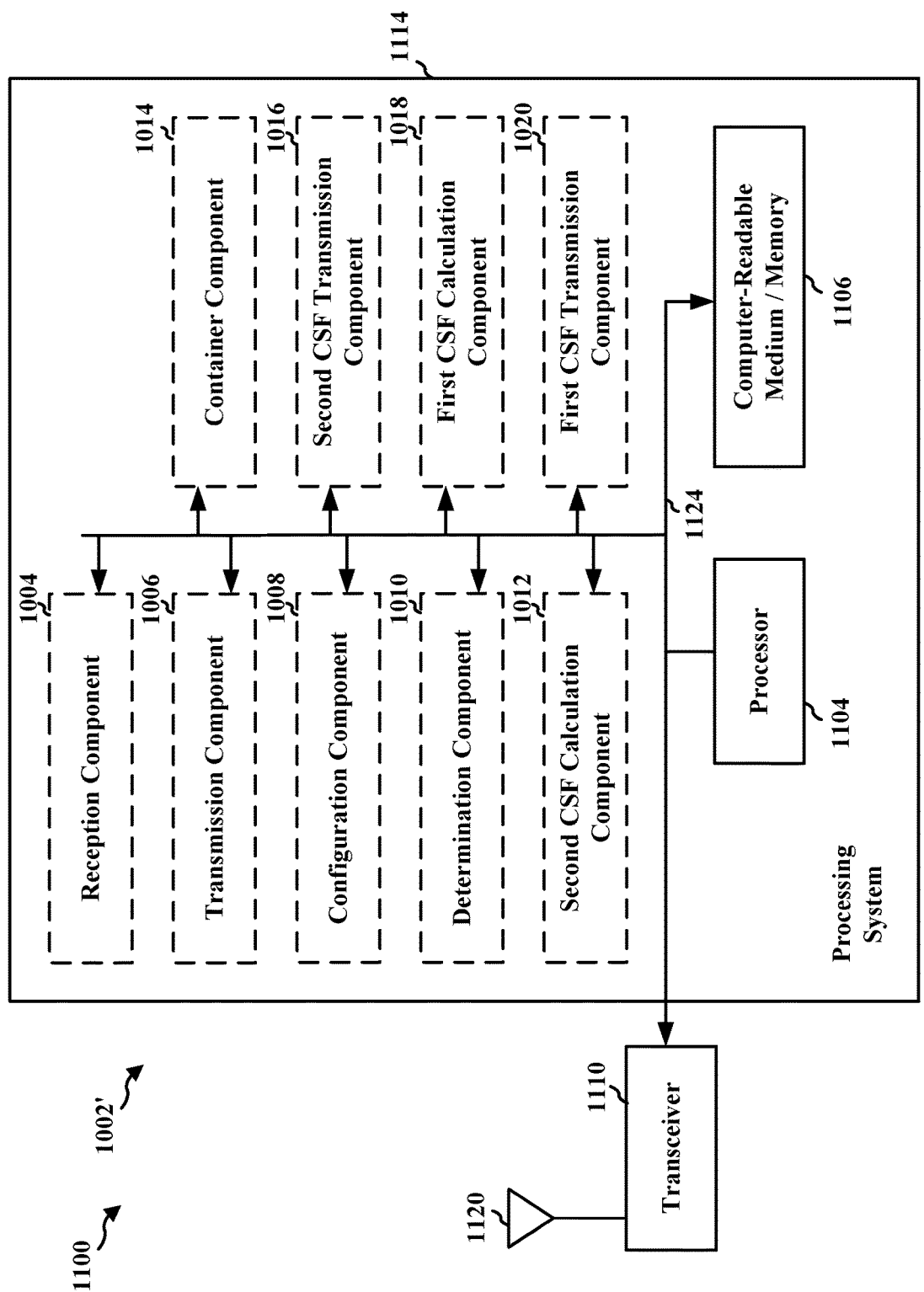
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving a configuration from a base station to transmit CSF using a first codebook type and means for determining whether to transmit the CSF using the first codebook type or a second codebook type. The apparatus may further include means for transmitting the CSF using a selected codebook type based on a determination of whether to transmit the CSF using the first codebook type or the second codebook type, e.g., means for transmitting the CSF using the first codebook type and means for transmitting the CSF using the second codebook type. The apparatus may include means for computing the channel state feedback using the second codebook type, e.g., when the means for determining determines to use the second codebook type. The apparatus may include means for computing the channel state feedback using the first codebook type based on the determination, e.g., when the means for determining determine to use the first codebook type. The apparatus may include means for transmitting the CSF using the second codebook type within a container in UCI for the first codebook type. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Thus, as described above, scenarios exists where CSI feedback based on a Type II codebook may offer less performance gain than CSI feedback based on a Type I single panel codebook, while burdening the UE with a large overhead and significant computational and transmission power requirements in computing PMI for Type II CSI feedback. Accordingly, the present disclosure allows UEs configured for Type II CSI feedback to detect based on one or more antenna configurations or channel conditions whether Type I single panel codebooks and Type II codebooks would be likely to deliver approximately the same performance gain, and based on that detection, to determine whether to use the Type II codebook normally or to revert back to a Type I codebook when performing the CSI feedback procedure and PMI computation. Based on this determination, the UE may compute PMI based on the Type I codebook instead, thereby saving significant computational power, transmission power, and/or overhead when computing and reporting CSI feedback. Moreover, the present disclosure allows these UEs to signal the PMI computed based on the Type I single panel codebook within the UCI payload for Type II CSI feedback information to the base station. In this way, a UE may signal Type I precoding information in the allocated resources for Type II CSI feedback without requiring a separate signaling format, thereby simplifying and enabling reuse of the Type II CSI feedback procedure.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a configuration from a base station to transmit channel state feedback (CSF) using a first codebook type;
   determining whether to transmit the CSF using the first codebook type or a second codebook type, wherein the UE determines to transmit the CSF using the second codebook type based on one or more of an antenna configuration or a channel condition, and
   wherein the channel condition comprises a signal-to-noise ratio (SNR) and wherein the UE determines to transmit the CSF using the first codebook type when the SNR is below an SNR threshold and determines to transmit the CSF using the second codebook type when the SNR meets the SNR threshold; and
   transmitting the CSF using a selected codebook type based on a determination of whether to transmit the CSF using the first codebook type or the second codebook type.

2. The method of claim 1, wherein the first codebook type comprises a Type II codebook and the second codebook type comprises a Type I codebook.

3. The method of claim 1, wherein the antenna configuration comprises a number of antenna ports, and wherein the UE determines to transmit the CSF using the second codebook type when the number of antenna ports is lower than an antenna port threshold and determines to transmit the CSF using the first codebook type when the number of antenna ports meets the antenna port threshold.

4. The method of claim 1, wherein the antenna configuration comprises an antenna correlation, and wherein the UE determines to transmit the CSF using the first codebook type when the antenna correlation is below a correlation threshold and determines to transmit the CSF using the second codebook type when the antenna correlation exceeds the correlation threshold.

5. The method of claim 1, wherein the antenna configuration comprises a number of beams configured for the second codebook type, and wherein the UE determines to transmit the CSF using the first codebook type when the number of beams meets a beam threshold and determines to transmit the CSF using the second codebook type when the number of beams is lower than the beam threshold.

6. The method of claim 1, wherein the channel condition comprises a number of users communicating based on multi-user multiple-input-multiple-output (MU-MIMO), and wherein the UE determines to transmit the CSF using the first codebook type when the number of users is below a user threshold and determines to transmit the CSF using the second codebook type when the number of users meets the user threshold.

7. The method of claim 1, wherein the channel condition comprises at least one of a statistical channel property or interference from other users, and wherein the UE determines to transmit the CSF using the second codebook type based on the statistical channel property or interference.

8. The method of claim 1, further comprising:
   computing the CSF using the second codebook type based on the determination.

9. The method of claim 1, further comprising:
transmitting the CSF using the second codebook type within a container in uplink control information (UCI) for the first codebook type.

10. An apparatus for wireless communication, comprising:
means for receiving a configuration from a base station to transmit channel state feedback (CSF) using a first codebook type;
means for determining whether to transmit the CSF using the first codebook type or a second codebook type, wherein the means for determining is configured to determine to transmit the CSF using the second codebook type based on one or more of an antenna configuration or a channel condition, and
wherein the channel condition comprises a signal-to-noise ratio (SNR) and wherein the means for determining is configured to determine to transmit the CSF using the first codebook type when the SNR is below an SNR threshold and to determine to transmit the CSF using the second codebook type when the SNR meets the SNR threshold; and
means for transmitting the CSF using a selected codebook type based on a determination of whether to transmit the CSF using the first codebook type or the second codebook type.

11. The apparatus of claim 10, further comprising:
means for computing the CSF using the second codebook type based on the determination.

12. The apparatus of claim 10, further comprising:
means for transmitting the CSF using the second codebook type within a container in uplink control information (UCI) for the first codebook type.

13. An apparatus for wireless communication, comprising:
a memory; and
at least one processor coupled to the memory and configured to:
receive a configuration from a base station to transmit channel state feedback (CSF) using a first codebook type;
determine whether to transmit the CSF using the first codebook type or a second codebook type, wherein the at least one processor is configured to determine to transmit the CSF using the second codebook type based on one or more of an antenna configuration or a channel condition, and
wherein the channel condition comprises a signal-to-noise ratio (SNR) and wherein the at least one processor is configured to determine to transmit the CSF using the first codebook type when the SNR is below an SNR threshold and to determine to transmit the CSF using the second codebook type when the SNR meets the SNR threshold; and
transmit the CSF using a selected codebook type based on a determination of whether to transmit the CSF using the first codebook type or the second codebook type.

14. The apparatus of claim 13, wherein the first codebook type comprises a Type II codebook and the second codebook type comprises a Type I codebook.

15. The apparatus of claim 13, wherein the antenna configuration comprises a number of antenna ports, and wherein the at least one processor is configured to determine to transmit the CSF using the second codebook type when the number of antenna ports is lower than an antenna port threshold and to determine to transmit the CSF using the first codebook type when the number of antenna ports meets the antenna port threshold.

16. The apparatus of claim 13, wherein the antenna configuration comprises an antenna correlation, and wherein the at least one processor is configured to determine to transmit the CSF using the first codebook type when the antenna correlation is below a correlation threshold and to determine to transmit the CSF using the second codebook type when the antenna correlation exceeds the correlation threshold.

17. The apparatus of claim 13, wherein the antenna configuration comprises a number of beams configured for the second codebook type, and wherein the at least one processor is configured to determine to transmit the CSF using the first codebook type when the number of beams meets a beam threshold and to determine to transmit the CSF using the second codebook type when the number of beams is lower than the beam threshold.

18. The apparatus of claim 13, wherein the channel condition comprises a number of users communicating based on multi-user multiple-input-multiple-output (MU-MIMO), and wherein the at least one processor is configured to determine to transmit the CSF using the first codebook type when the number of users is below a user threshold and to determine to transmit the CSF using the second codebook type when the number of users meets the user threshold.

19. The apparatus of claim 13, wherein the channel condition comprises at least one of a statistical channel property or interference from other users, and wherein the at least one processor is configured to determine to transmit the CSF using the second codebook type based on the statistical channel property or interference.

20. The apparatus of claim 13, wherein the at least one processor is further configured to:
compute the CSF using the second codebook type based on the determination.

21. The apparatus of claim 13, wherein the at least one processor is further configured to:
transmit the CSF using the second codebook type within a container in uplink control information (UCI) for the first codebook type.

22. A non-transitory computer-readable medium storing computer executable code, the code when executed by a processor cause the processor to:
receive a configuration from a base station to transmit channel state feedback (CSF) using a first codebook type;
determine whether to transmit the CSF using the first codebook type or a second codebook type, wherein the code when executed by the processor cause the processor to determine to transmit the CSF using the second codebook type based on one or more of an antenna configuration or a channel condition, and
wherein the channel condition comprises a signal-to-noise ratio (SNR) and wherein the code when executed by the processor cause the processor to determine to transmit the CSF using the first codebook type when the SNR is below an SNR threshold and to determine to transmit the CSF using the second codebook type when the SNR meets the SNR threshold; and
transmit the CSF using a selected codebook type based on a determination of whether to transmit the CSF using the first codebook type or the second codebook type.

23. The non-transitory computer-readable medium of claim 22, wherein the code when executed by the processor further cause the processor to:

compute the CSF using the second codebook type based on the determination.

24. The non-transitory computer-readable medium of claim 22, wherein the code when executed by the processor further cause the processor to:
transmit the CSF using the second codebook type within a container in uplink control information (UCI) for the first codebook type.

* * * * *